(12) United States Patent (10) Patent No.: US 7,584,419 B1
Jones et al. (45) Date of Patent: Sep. 1, 2009

(54) REPRESENTING NON-STRUCTURED FEATURES IN A WELL FORMED DOCUMENT

(75) Inventors: Brian Jones, Redmond, WA (US); Robert Little, Redmond, WA (US); Marcin Sawicki, Kirkland, WA (US); Andrew Bishop, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 244 days.

(21) Appl. No.: 10/727,276

(22) Filed: Dec. 3, 2003

Related U.S. Application Data

(63) Continuation-in-part of application No. 10/187,060, filed on Jun. 28, 2002.

(51) Int. Cl.
*G06F 17/00* (2006.01)
(52) U.S. Cl. .................. 715/234; 715/236; 715/237
(58) Field of Classification Search .......... 715/513, 715/523, 234, 236, 237
See application file for complete search history.

(56) References Cited

U.S. PATENT DOCUMENTS

| | | | | |
|---|---|---|---|---|
| 4,751,740 A | 6/1988 | Wright | | 382/180 |
| 4,864,501 A | 9/1989 | Kucera et al. | | 704/8 |
| 4,866,777 A * | 9/1989 | Mulla et al. | | 704/206 |
| 5,185,818 A | 2/1993 | Warnock | | 382/112 |
| 5,295,266 A | 3/1994 | Hinsley et al. | | 718/101 |
| 5,557,722 A | 9/1996 | DeRose et al. | | 715/513 |
| 5,579,466 A | 11/1996 | Habib et al. | | 715/529 |
| 5,586,241 A | 12/1996 | Bauermeister et al. | | 345/467 |
| 5,781,714 A | 7/1998 | Collins et al. | | 345/171 |
| 5,787,451 A | 7/1998 | Mogilevsky | | 715/533 |
| 5,881,225 A | 3/1999 | Worth | | 726/17 |
| 5,895,476 A | 4/1999 | Orr et al. | | 715/202 |
| 6,023,714 A | 2/2000 | Hill et al. | | 715/513 |
| 6,031,989 A | 2/2000 | Cordell | | 717/109 |
| 6,044,387 A | 3/2000 | Angiulo et al. | | 715/533 |
| 6,092,068 A | 7/2000 | Dinkelacker | | 707/100 |
| 6,119,136 A | 9/2000 | Takata et al. | | 715/513 |
| 6,141,754 A | 10/2000 | Choy | | 726/1 |
| 6,182,029 B1 | 1/2001 | Friedman | | 704/9 |
| 6,209,124 B1 | 3/2001 | Vermeire et al. | | 717/114 |
| 6,230,173 B1 | 5/2001 | Ferrel et al. | | 715/513 |
| 6,233,592 B1 | 5/2001 | Schnelle et al. | | 715/513 |
| 6,249,794 B1 | 6/2001 | Raman | | 715/500 |
| 6,336,124 B1 | 1/2002 | Alam et al. | | 715/523 |
| 6,397,232 B1 | 5/2002 | Cheng-Hung et al. | | 715/523 |
| 6,507,856 B1 | 1/2003 | Chen et al. | | 715/513 |
| 6,507,857 B1 | 1/2003 | Yalcinalp | | 715/513 |
| 6,519,617 B1 | 2/2003 | Wanderski et al. | | 715/513 |
| 6,535,896 B2 | 3/2003 | Britton et al. | | 715/523 |
| 6,538,673 B1 | 3/2003 | Maslov | | 715/853 |
| 6,613,098 B1 | 9/2003 | Sorge et al. | | 715/234 |

(Continued)

FOREIGN PATENT DOCUMENTS

EP        1230566        2/2005

OTHER PUBLICATIONS

Ayers, Larry, "AbiWord's Potential", Linux Gazette, Issue 43, Jul. 1999, pp. 1-4.*

(Continued)

*Primary Examiner*—Stephen S Hong
*Assistant Examiner*—Matthew J Ludwig
(74) *Attorney, Agent, or Firm*—Merchant & Gould, P.C.

(57) ABSTRACT

The present invention represents non-structured features that are common with word-processors such that these elements can be recognized and parsed separately from other elements within an XML document. Empty tags are used to mark the start and end of a feature that may span other features.

15 Claims, 5 Drawing Sheets

U.S. PATENT DOCUMENTS

| | | | |
|---|---|---|---|
| 6,675,353 | B1 | 1/2004 | Friedman .................... 715/513 |
| 6,697,999 | B1 | 2/2004 | Breuer et al. ............... 715/517 |
| 6,725,423 | B1 | 4/2004 | Muramoto et al. .......... 715/513 |
| 6,725,426 | B1 | 4/2004 | Pavlov ....................... 715/523 |
| 6,754,648 | B1 | 6/2004 | Fittges et al. .................. 707/1 |
| 6,763,500 | B2 | 7/2004 | Black et al. ................ 715/513 |
| 6,785,685 | B2 | 8/2004 | Soetarman et al. ......... 707/101 |
| 6,799,299 | B1 | 9/2004 | Li et al. ...................... 715/513 |
| 6,829,570 | B1 | 12/2004 | Thambynayagam et al. .. 703/10 |
| 6,829,745 | B2 | 12/2004 | Yassin et al. ................ 715/513 |
| 6,845,483 | B1 | 1/2005 | Carroll ....................... 715/513 |
| 6,886,115 | B2 | 4/2005 | Kondoh et al. ................ 714/52 |
| 6,918,086 | B2 | 7/2005 | Rogson ..................... 715/533 |
| 6,928,610 | B2 | 8/2005 | Brintzenhofe et al. ....... 715/202 |
| 6,938,204 | B1 | 8/2005 | Hind et al. .................. 715/515 |
| 6,941,510 | B1 | 9/2005 | Ozzie et al. ................ 715/513 |
| 6,954,898 | B1 | 10/2005 | Nakai et al. ................. 715/262 |
| 6,968,503 | B1 | 11/2005 | Chang et al. ................ 715/526 |
| 6,996,772 | B2 | 2/2006 | Justice et al. ............... 715/513 |
| 7,028,009 | B2 | 4/2006 | Wang et al. ................... 705/51 |
| 7,257,772 | B1 | 8/2007 | Jones et al. ................. 715/234 |
| 7,275,209 | B1 | 9/2007 | Jones et al. ................. 715/234 |
| 7,376,650 | B1 | 5/2008 | Ruhlen .......................... 707/6 |
| 7,389,473 | B1 | 6/2008 | Sawicki et al. .............. 715/255 |
| 2001/0014900 | A1 | 8/2001 | Brauer et al. ............... 707/513 |
| 2001/0032217 | A1 | 10/2001 | Huang ........................ 715/239 |
| 2002/0087702 | A1 | 7/2002 | Mori ........................ 709/228 |
| 2002/0091725 | A1 | 7/2002 | Skok ....................... 707/501.1 |
| 2002/0124115 | A1 | 9/2002 | McLean et al. ............. 709/310 |
| 2002/0184189 | A1 | 12/2002 | Hay et al. ....................... 707/1 |
| 2003/0007014 | A1 | 1/2003 | Suppan et al. .............. 345/853 |
| 2003/0018668 | A1 | 1/2003 | Britton et al. ............... 715/230 |
| 2003/0101416 | A1 | 5/2003 | McInnes et al. ............. 715/513 |
| 2003/0135584 | A1* | 7/2003 | Roberts et al. .............. 709/214 |
| 2003/0163784 | A1 | 8/2003 | Daniel et al. ................ 715/514 |
| 2003/0167444 | A1 | 9/2003 | Zorc ......................... 715/513 |
| 2003/0231626 | A1 | 12/2003 | Chuah et al. ................ 370/389 |
| 2004/0073871 | A1 | 4/2004 | Giannetti .................... 715/201 |
| 2004/0098320 | A1 | 5/2004 | Mitsuhashi et al. ........... 705/27 |
| 2004/0194035 | A1 | 9/2004 | Chakraborty ............... 715/531 |
| 2004/0205553 | A1 | 10/2004 | Hall et al. ................... 715/513 |
| 2004/0210818 | A1 | 10/2004 | Jones et al. ................. 715/236 |
| 2005/0102265 | A1 | 5/2005 | Jones et al. .................... 707/1 |
| 2005/0108198 | A1 | 5/2005 | Jones et al. .................... 707/1 |
| 2005/0108278 | A1 | 5/2005 | Jones et al. ................. 707/102 |

OTHER PUBLICATIONS

"XML Schema for AviWord Markup language", downloaded from http://www.abisource.com/awml.xsd, May 27, 2000, pp. 1-3.*

O'Reilly, 'HTML & XHTML The Definitive Guide', Fourth Edition, Copyright 2000, pp. 1-6, http://oreilly.jungles.ru/webdesign/xhtml/ch16_03.htm.*

M. Schrage, "Proxima, A presentation-oriented editor for structured documents", IPA, ISBN 12-345-6789-0, Jun. 4, 1973, pp. 1-186.

V. Turau, "Making legacy data accessible for XML applications", University of Applied Sciences, Department of Computer Science, Wiesbaden, Germany, 1999, pp. 1-11.

M. Kirjavainen, "XML Browsers", http://mia.ece.uic.edu/~papers/WWW/MultimediaStandards/XML_browsers.pdf, last accessed Mar. 14, 2005, 16 pgs.

Pradeep Jain; "Creating XML from Microsoft Word: The Challenges", Dec. 3-8, 2000, pp. 136-144.

Jon Bosak, "XML: The Universal Publishing Format", 1998, pp. 1-2.

M. Fernandez et al., "Advanced Technology Seminar", p. 323.

Uros Novak et al., "Experimental XSLT Processor for Objects", Proceedings of the IASTED International Conference, Applied Informatics, Feb. 18-21, 2002, pp. 277-282.

"XML Schema Part I: Structures", W3C Recommendation, May 2, 2001, downloaded from http://www.w3.org/TR2001/REC-xmlschema-1-20010502/, pp. 1-19.

HyperVision, Ltd., "WorX 2.1 Authoring Guide for XML 2001", Sep. 2001, downloaded from http://www.xmlconference.org/xmlusa/2001/XML2.1AuthoringGuideforXML2001.pdf, pp. 1-29.

Wen, Howard, "AbiWord: Open Source's Answer to Microsoft Word", Linux Dev Center, downloaded from http://www.linuxdevcenter.com/lpt/a/1636, Mar. 14, 2002, pp. 1-3.

Dzuba, Vassili, "Majix 1.0: A Word to XML Converter", downloaded from http://xml.coverpages.org/majix10Ann.html, Oct. 6, 1998, pp. 1-2.

Schmelzer, Ronald, "ZapThink Briefing Note—HyperVision—Automating Valid XML Document Creation Within Microsoft Word", ZapThink LLC, Feb. 8, 2002, pp. 1-6.

Alschuler, Liora, "Getting the Tags In: Vendors Grapple With XML-Authoring, Editing and Cleanup", Seybold Report on Internet Publishing, vol. 5. No. 6, Feb. 2001, pp. 1-6.

Moseley, Lonnie et al., "Mastering Microsoft Office 97 Professional Edition", Sybex, 1996, pp. 87, 94-98, 103-105, 165-179, 1114-1115.

"AbiWord", http://en.wikipedia.org/wiki/AbiWord>, Oct. 19, 2005, 2 pgs.

Walther, P., "XML Dokumente in Microsoft Word mit neuem Produkt der struktur AG kostenlos testen", http://www.contentmanager.de/magazine/news_h2695_xml_dokumente_in_microsoft_word_mit_neuem.html>, Jun. 5, 2002, 2 pgs.

Chipr, "AbiWord—Word Processing For Everyone", http://www.kuro5hin.org/?op=displaystory;sid=2002/4/22/22406/9615>, Apr. 23, 2002, 8 pgs.

"Introduction to AbiWord", http://web.archive.org/web/20010608211934/www.abisource.com/help/en-US/index.htm, Jun. 8, 2001, 3 pgs.

"XML Schema for AbiWord Markup Language", http://www.abisource.com/awml.xsd>, Apr. 27, 2000, 3 pgs.

Liefke, Harmut et al., "Xmill: An Efficient Compressor for XML Data", SCM SIGMOD Record, vol. 29, Issue 2, May 2000, pp. 153-164.

McGrath, Robert, "Representing "Binary" Data in XML", downloaded from http://ndf.ncsa.uiuc.edu/HDF5/XML/tools/binary.html, Mar. 2001, pp. 1-4.

Jeong, Euna et al., "Semistrutured Data: Induction of Integrated View for XML Data With Heterogeneous DTDs", Proceedings of the Tenth International Conference on Information and Knowledge Management, Oct. 2001, pp. 151-158.

"XML Schema—Lecture 4 Notes", downloaded from http://www.cs.rpi.edu/~puninj/XMLJ/classes/class4/all.html, Nov. 21, 2001, pp. 1-14.

Mansfield, Ron, "Mastering Word 97 Fourth Edition", 1997, Sybex, pp. 269-270, 412, 449-457, 985-986, 1010-1011, 1028-1029, 1031-1034.

Rusty Elliotte, "XML Bible", IDG Books Worldwide, Inc., 1999, pp. 1-12, 120-127, 333-335.

Microsoft, "Microsoft Word 2000", 1999, Microsoft, Screenshots 1-7, pp. 1-2.

Oliver Meyer, "Creating Validated XML Documents on the Fly Using MS Word", Oct. 20, 2002, pp. 113-121.

Simplson, J., "Just XML", Prentice Hall, Second Edition, 2001, cover, copyright page, and p. 31.

"Introduction to XML" University of Washington Computing and Communications, copyright 1999, on the Internet as of Jun. 24, 2001, downloaded from http://web.archive.org/web/20010624123830/http://www.washington.edu/computing/training/540/xml_well.html, 1 pg.

Munro, J., "StarOffice 6.0 Lives Up to its Name", PCMAG.com, May 23, 2002, www.pcmag.com/print_article2/0,1217,a=27287,00.asp, downloaded pp. 1-3.

Castro, E., "XML for the World Wide Web, Visual Quickstart Guide", Peachpit Press, 2001, p. 245.

Rodriguez, M., "XML: Twig", xmltwig.com, copyright 2003, downloaded pp. 1-4, web.archive.org/web/20030422002120/http://www.xmltwig.com/xmltwig/tools/xml_spellcheck.

Xmetal 1.0, Webreference.com, Oct. 29, 1999, downloaded pp. 1-2, www.webreference.com/html/watch/xmetal/5.html.

Altova Inc. & Altova GmbH, "XML Spy 4.0 Manual," copyright 1998-2001, Sep. 10, 2001, downloaded from: http://www.altova.com/download.sub.—archive.html and link, pp. 18-286.

"TEI, The XML Version of the TEI Guidelines" Text Encoding Initiative [TEI] Consortium, Copyright 2001, with Introductory Note, dated Mar. 2002, downloaded from: http://www.tei-c.org.uk/Drafts/P4/driver.xml, on Nov. 25, 2006, downloaded pp. 1-93.

M. Fernandez and S. Amer-Yahia; Advanced Technology Seminar 2—Techniques for Storing XML; pp. 323, 774-776.

Michael Champion; Storing XML in Databases; EAI Journal, Oct. 2001; pp. 53-55.

JP Morgenthal; XML for Data Integration; EAI Journal, Oct. 2001; pp. 13-14, 16.

Sihem Amer-Yahia, Mary Fernandez, Divesh Srivastava and Yu Xu; PIX: A System for Phrase Matching in XML Documents: A Demonstration; 2003 IEEE; pp. 774-776.

Altova Inc. & Altova GmbH, "XML Spy 4.0 Manual," copyright 1998-2001, published Sep. 9, 2001, pp. 1-401.

Alshuler, L., "Getting the Tags In: Vendors Grapple with XML-Authoring, Editing and Cleanup," The Seybold Report on Internet Publishing, vol. 5, No. 6, Feb. 2001, pp. 1-6.

HV, Ltd., "WorX Standard Edition (SE) 'XML Authoring Made Easy'," HyperVision, Ltd., published on the Internet as of Jun. 3, 2001 as a PDF file linked to http://web.archive.org/web/20010603152210/www.hvltd.com/default.asp?name=-information/xml/worxseOverview.xml&display=information/xsl/default.xsl, pp. 1-9.

Mathias Neumuller and John N. Wilson; Improving XML Processing Using Adapted Data Structures; Oct. 7-10, 2002; pp. 206-220.

Surajit Chaudhuri and Kyuseok Shim; Storage and Retrieval of XML Data using Relational Databases; Advanced Technology Seminar 4; Abstract; Mar. 5, 2003; p. 802.

Ullas Nambiar et al.; Efficient XML Data Management: An Analysis; EC-Web 2002, LNCS 2455; pp. 87-98.

Volkan Atalay and Erkan Arslan; An SGML Based Viewer for Form Documents; 1999 IEEE Jul. 1999; pp. 201-204.

Xin Zhang et al.; Clock: Synchronizing Internal Relational Storage with External XML Documents; 2001 IEEE Jun. 2001; pp. 111-118.

Robert D. Cameron; REX: XML shallow parsing with regular expressions; Markup Languages: Theory & Practice 1.3, Summer 1999; pp. 61-88.

Danny Heijl; The Delphi XML SAX2 Component & MSXML 3.10; Dr. Dobb's Journal, Sep. 2001; pp. 42-54.

Chiyoung Seo et al.; An efficient inverted index technique for XML documents using RDBMS; Received Jan. 16, 2002; Information and Software Technology 45 (2003), Jun. 1, 2002; pp. 11-22.

Torsten Grabs et al.; XMLTM: Efficient Transaction Management for XML Documents; CIKM'02, Nov. 4-9, 2002; pp. 142-152.

Michael Floyd, "Debugging XML Applications", Aug. 2000, www.webtechniques.com, pp. 79-81.

James E. Powell, "Microsoft Office Beta 2 on the Horizon", WinMag.com, Nov. 3, 2000.

Milbery, J., "WorX SE", XML Journal, published Feb. 4, 2001, downloaded from http://xml.sys-con.com/read/40149.htm, downloaded pp. 1-5.

Patrick Marshall, "DocuShare 2.0 Makes Web Document Management Work", Sep. 27, 1999.

Dan Franks, "Crowd Control (Secrets)", Jun. 1, 2002, MacWorld, vol. 19, No. 6, p. 102.

John Lombardi, "Word Pro Excels at 'Team' Work", Info World, Jan. 8, 1996, p. 86.

Kathy Yakal, "Elegant Document Distribution", Computer Shopper, Nov. 1995, pp. 1-2.

Jon Udell, "Getting Traction", Jul. 12, 2002.

Sun Microsystems, "StarOffice XML File Format Working Draft", Jan. 2001, Draft 10, pp. 19, 89, 142, and 234, http://web.archive.org/web/20010603030227/xml.openoffice.org/xml_specification_draft.pdf.

Y. Ishitani, "Document Transformation System from Papers to XML Data Based on Pivot XML Document Method", IEEE Computer Society, Seventh International Conference on Document Analysis and Recognition, 6 pgs., Aug. 3-6, 2003.

Altamura et al., "Transforming paper documents into XML format with WISDOM++", Nov. 7, 2000, IJDAR, pp. 6-12.

Klink et al., "Document Structure Analysis Based on Layout and Textual Features", Sep. 25, 2000, DFKI, pp. 1a, 3, 4, and 11.

"Creating DocBook Documents", Aug. 2, 2001, pp. 1 and 16, http://web.archive.org/web/20020615124747/www.docbook.org/tdg/en/html/ch02.html.

David Eisenberg, "Using XSL Formatting Objects", Jan. 17, 2001, pp. 1a and 1, http://www.xml.com/pub/a/2001/01/17/xsl-fo/index.html?page=2.

"Star Office XML File Format Working Draft", Sun Microsystems, Inc., pp. 57, 59.

W. Wadge, "Intensional Markup Language", Proceedings of the Third International Workshop, DCW 2000, Quebec City, Canada, Jun. 19-21, 2000, pp. 82-89.

Unicode Inc., "Unicode Technical Reports", Sep. 21, 2002, pp. 1, 2, 638, 642, and 644.

Star Office XML File Format Working Draft, Sun Microsystems, Inc., pp. 1, 19, and 196.

Rohr, Paul, "RE: Styles Again", downloaded from http://www.abisource.org/mailinglists/abiword-dev/01/May/0561.html, May 2001, pp. 1-2.

W3C, "XML Schema Requirements", W3C Note, Feb. 15, 1999, downloaded from www.w3.org/TR/NOTE-xml-schema-req, pp. 1-5.

Ray, Erik T., "Learning XML", O'Reilly & Associates, Inc., Jan. 2001, cover, copyright, and Chapter 5 downloaded pp. 1-25.

Glenn, Walter, "Word 2000 in a Nutshell", O'Reilly & Associates, Inc., Aug. 2000, cover, copyright, and sections 16.4 and 16.3, downloaded pp. 1-8.

Liberty, J. et al., "XML Web Documents from Scratch", Que Corporation, Mar. 10, 2000, cover, copyright, chapters 1 and 2, downloaded pp. 1-16.

Watchorn, H. et al., "Word and XML: Making the 'Twain Meet'", XML Europe 2001, papers, May 2001, downloaded pp. 1-11.

Novak, U. et al., "Experimental XSLT Processor for Objects", Proceedings of the JASTED Int'l Conf. On Applied Informatics, Feb. 2002, pp. 277-282.

XML Workshop Ltd., "Word to XML Converters", Mar. 7, 2003, downloaded pp. 1-2.

YAWC Pro, "Welcome to YAWC Pro", Dec. 11, 2001, 1 pg.

"YAWC Pro 1.0 Installation & User Guide", pp. 1-11.

"Case Study: Converting Word Into XML", YAWC Pro, 1 pg.

"Case Study: Maintaining Websites with Microsoft Word", YAWC Pro, 1 pg.

"Case Study: Publishing Content to the Web and Mobile Phones", YAWC Pro., 1 pg.

"Case Study: Typsetting XML with QuarkXPress", YAWC Pro, 1 pg.

Skylar, D., "The Annotated Rainbow DTD, Rainbow Version 2.5", Electronic Book Technologies, Inc., Feb. 8, 1995, pp. 1-12.

Tetrasix, "Welcome to Tetrasix Web Site", re: MajiX, Apr, 18, 2001, downloaded pp. 1-3.

Infinity-Loop, Web Site Home Page, re: infinity-loop, Apr. 20, 2001, 1 pg.

Sun Microsystems, "The OpenOffice.org Source Project", Sun Microsystems, Inc., 2000, downloaded pp. 1-34.

Harold, Rusty Elliotte, "XML Bible", IDG Books Worldwide, 1999, pp. 369-388.

W3C, "XML Schema Part 0: Primer", W3C Recommendation, May 2, 2001, downloaded pp. 1-67.

Case Western Reserve University (CRWU), "Introduction to HTML", Case Western Reserve University and Eric A. Meyer, Mar. 4, 2000, downloaded from web.archive.org/web/20000304042655/http://www.cwru.edu/help/introHTML/toc.html, downloaded pp. 1-157.

Lemay, Laura, "Teach Yourself Web Publishing with HTML 4 in 14 Days, Professional Reference Edition", Second Edition, Sams.net Publishing, 1997, pp. 778-789.

White, B. et al., "Standard Structural Elements" from "Web Content Accessibility Tips and Tricks", May 1, 2001, downloaded pp. 1-4.

Juran, J., "MML: The Modest Markup Language", Oct. 22, 2000, downloaded pp. 1-15.

University of Georgia Center for Continuing Education, "Exploring the World-Wide Web, Hypertext Markup Language", Feb. 24, 1999, downloaded pp. 1-7.

Cagle et al., "Professional XSL", Wrox Press Ltd., 2001, cover and copyright pp. 9-21.

Castro, Elizabeth, "XML for the World Wide Web: Visual QuickStart Guide," Oct. 23, 2000, Peachpit Press, pp. 1-6.

Castro, Elizabeth, "XML for the World Wide Web", Published by Peachpit Press, 2001, pp. 182-184.

DevX Staff, "Twelve Dynamic HTML Lessons," downloaded from http://devx.com/projectcool/Article/18103/1763, published Jan. 1, 2000, pp. 1-3.

Harold, Rusty Elliotte, "XML Bible", IDG Books Worldwide, 1999, title page, copyright page, and pp. 1-15, 95-132, 191-200, 333-336, 352-360, and 433-567.

Linss, Peter, "CSS Namespace Enhancements (proposal)", Jun. 1999, W3C, pp. 1-7.

Mansfield, Ron, "Mastering Word 97 Fourth Edition", 1997, Sybex, pp. 221-222, 271-273, 278, 280, 283-284, 325-330, 539-540, 1015.

Meyer, Eric, "Cascading Style Sheets: HTML and CSS", May 2000, O'Reilly, pp. 1-17.

Scott Boggan and Micael De Laurentis, A System for Matching static or distortable fonts; May 1994; pp. 1-9; http://www.byte.com/art/940/sec12/art1.htm.

Sun Microsystems, "StarOffice XML File Format Working Draft", Jan. 2001, Draft 10, pp. 19 and 234, http://web.archive.org/web/20010603030227/xml.openoffice.org/xml_specification_draft.pdf.

Sun Microsystems, "StarOffice XML File Format Working Draft", Jan. 2001, Draft 10, pp. 48, 49, 51, 54-58.

W3C, Fonts, Jan. 24, 2001, W3C, pp. 1-4, http://web.archive.org/web/20010124044900/ttp://wvvw13.w3.org/TR/REC-CSS2/fonts.html#matching.

WayBack Machine, Feb. 15, 2006, p. 1, http://web.archive.org/web/*/http://wvvw.w3.org/T/Rec-CSS2/fonts.html - No Copy Available, Dead Link.

XHTML Examples, "XHTML explained—XHTML Examples," downloaded from http://web.archive.org/web/20020603200919/http://www.javascriptkit.com/howto/xhtml_intro4.Shtml, published Jun. 3, 2002, pp. 1-3.

* cited by examiner

REPRESENTING NON-STRUCTURED FEATURES IN A WELL FORMED DOCUMENT

RELATED APPLICATIONS

This patent application is a continuation-in-part application under 35 United States Code § 120 of U.S. patent application Ser. No. 10/187,060 filed on Jun. 28, 2002, which is incorporated herein by reference. An exemplary schema in accordance with the present invention is disclosed beginning on page 11 in an application entitled "Mixed Content Flexibility," Ser. No. 10/726,077, filed Dec. 2, 2003, which is hereby incorporated by reference in its entirety.

BACKGROUND OF THE INVENTION

Markup Languages have attained wide popularity in recent years. One type of markup language, Extensible Markup Language (XML), is a universal language that provides a way to identify, exchange, and process various kinds of data. For example, XML is used to create documents that can be utilized by a variety of application programs. Elements of an XML file have an associated namespace and schema.

In XML, a namespace is a unique identifier for a collection of names that are used in XML documents as element types and attribute names. The name of a namespace is commonly used to uniquely identify each class of XML document. The unique namespaces differentiate markup elements that come from different sources and happen to have the same name.

XML Schemata provide a way to describe and validate data in an XML environment. A schema states what elements and attributes are used to describe content in an XML document, where each element is allowed, what types of text contents are allowed within it and which elements can appear within which other elements. The use of schemata ensures that the document is structured in a consistent manner. Schemata may be created by a user and generally supported by an associated markup language, such as XML. By using an XML editor, the user can manipulate the XML file and generate XML documents that adhere to the schema the user has created. XML documents may be created to adhere to one or more schemata.

The XML standard is by many considered the ASCII format of the future, due to its expected pervasiveness throughout the hi-tech industry in the coming years. Recently, some word-processors have begun producing documents that are somewhat XML compatible. For example, some documents may be parsed using an application that understands XML.

In XML, it is necessary to maintain a well formed document. Generally, this means that tags within the XML document do not overlap. There are a number of features in word processors, however, that are allowed to span arbitrary ranges. These features include features such as comments, bookmarks, document protection, and the like. What is needed is a way to represent these features in XML.

SUMMARY OF THE INVENTION

The present invention is directed towards representing non-structured features that are common with word-processors such that these elements can be recognized and parsed separately from other elements within an XML document.

According to one aspect of the invention, non-structured features are represented as well formed in XML. Some of the features that may span arbitrary ranges include features such as comments, bookmarks, document protection, and the like.

According to another aspect of the invention, empty tags are used to mark the start and end of a feature that may span other features. These elements can be recognized and parsed separately from other elements.

According to yet another aspect of the invention, the word-processing documents may be parsed by applications that understand XML. The XML word-processing documents may be manipulated on a server, or anywhere even when the word-processor creating the XML document is not present.

DETAILED DESCRIPTION OF THE PREFERRED EMBODIMENT

Throughout the specification and claims, the following terms take the meanings explicitly associated herein, unless the context clearly dictates otherwise.

The terms "markup language" or "ML" refer to a language for special codes within a document that specify how parts of the document are to be interpreted by an application. In a word-processor file, the markup language specifies how the text is to be formatted or laid out, whereas in a particular customer schema, the ML tends to specify the text's meaning according to that customer's wishes (e.g., customerName, address, etc.) The ML is typically supported by a word-processor and may adhere to the rules of other markup languages, such as XML, while creating further rules of its own.

The term "element" refers to the basic unit of an ML document. The element may contain attributes, other elements, text, and other building blocks for an ML document.

The term "tag" refers to a command inserted in a document that delineates elements within an ML document. Each element can have no more than two tags: the start tag and the end tag. It is possible to have an empty element (with no content) in which case one tag is allowed.

The content between the tags is considered the element's "children" (or descendants). Hence other elements embedded in the element's content are called "child elements" or "child nodes" or the element. Text embedded directly in the content of the element is considered the element's "child text nodes". Together, the child elements and the text within an element constitute that element's "content".

The term "attribute" refers to an additional property set to a particular value and associated with the element. Elements may have an arbitrary number of attribute settings associated with them, including none. Attributes are used to associate additional information with an element that will not contain additional elements, or be treated as a text node.

Illustrative Operating Environment

Figure 1:
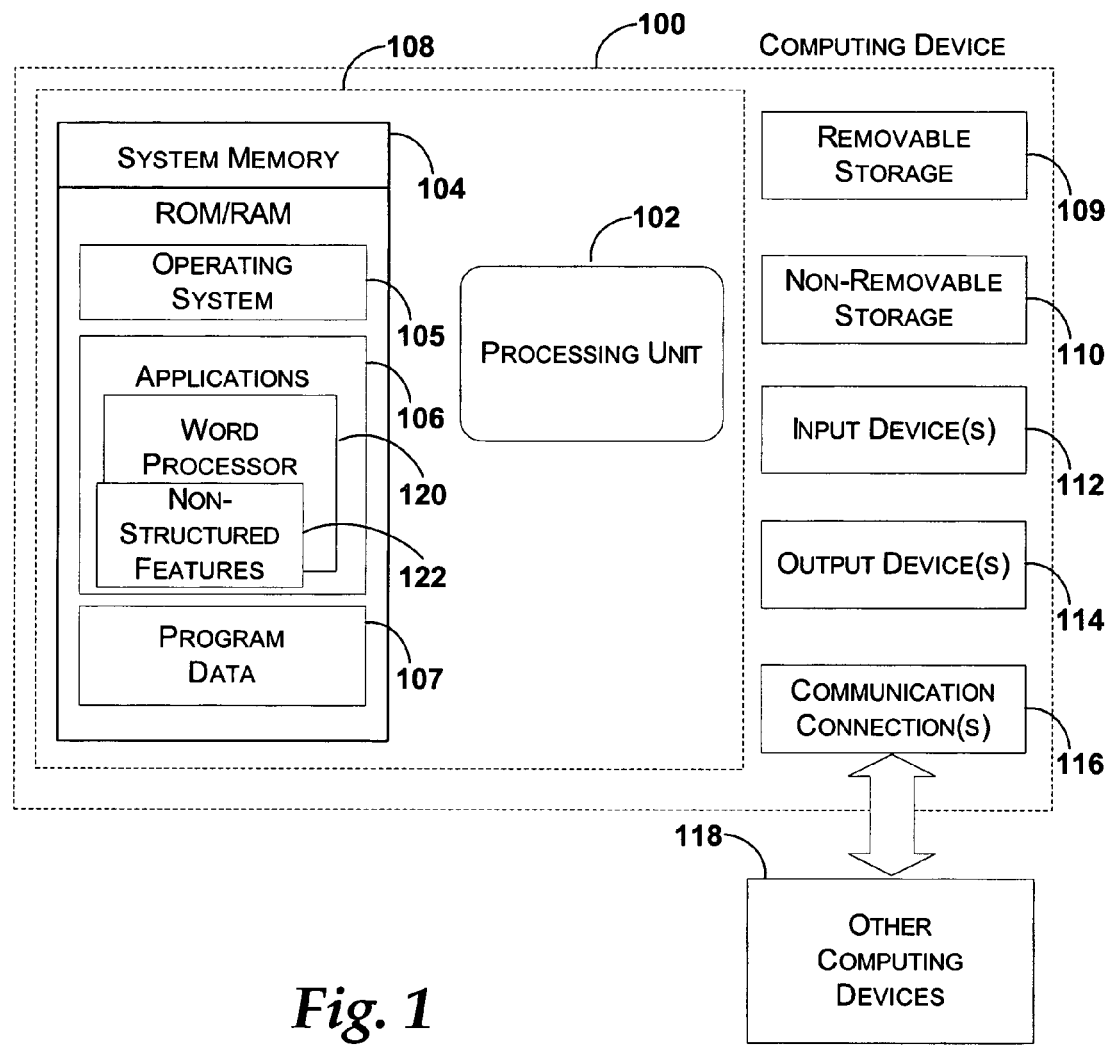
FIG. 1 illustrates an exemplary computing device that may be used in one exemplary embodiment of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a word-processor application 120 that further includes non-structured features 122. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Representing Non-Structured Features in a Well Formed Document

Generally, the present invention is directed at representing non-structured features common with word-processors such that these elements can be recognized and parsed separately from other elements In XML, it is necessary to maintain a well formed document. Generally, this means that tags within the XML document do not overlap. There are a number of features in word processors, however, that are allowed to span arbitrary ranges. These features include features such as comments, bookmarks, document protection, and the like.

Figure 2:
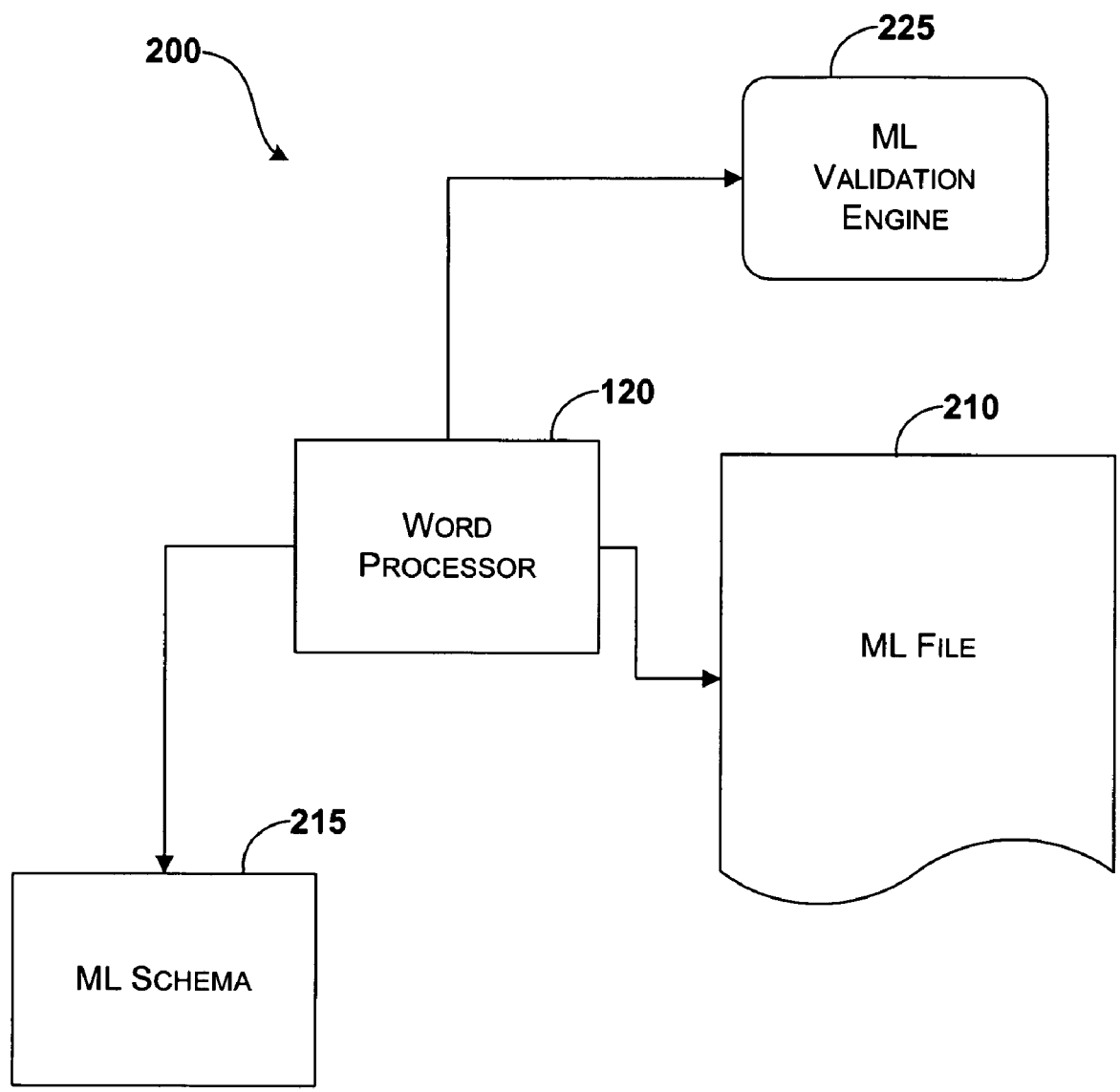
FIG. 2 is a block diagram illustrating an exemplary environment for practicing the present invention.

FIG. 2 is a block diagram illustrating an exemplary environment for practicing the present invention. The exemplary environment shown in FIG. 2 is a word-processor environment 200 that includes word-processor 120, ML file 210, ML Schema 215, and ML validation engine 225.

In one embodiment, word-processor 120 has its own namespace or namespaces and a schema, or a set of schemas, that is defined for use with documents associated with word-processor 120. The set of tags and attributes defined by the schema for word-processor 120 define the format of a document to such an extent that it is referred to as its own native ML. Word-processor 120 internally validates ML file 210. When validated, the ML elements are examined as to whether they conform to the ML schema 215. A schema states what tags and attributes are used to describe content in an ML document, where each tag is allowed, and which tags can appear within other tags, ensuring that the documentation is structured the same way. Accordingly, ML 210 is valid when structured as set forth in arbitrary ML schema 215.

ML validation engine 225 operates similarly to other available validation engines for ML documents. ML validation engine 225 evaluates ML that is in the format of the ML validation engine 225. For example, XML elements are forwarded to an XML validation engine. In one embodiment, a greater number of validation engines may be associated with word-processor 120 for validating a greater number of ML formats.

Figure 3:
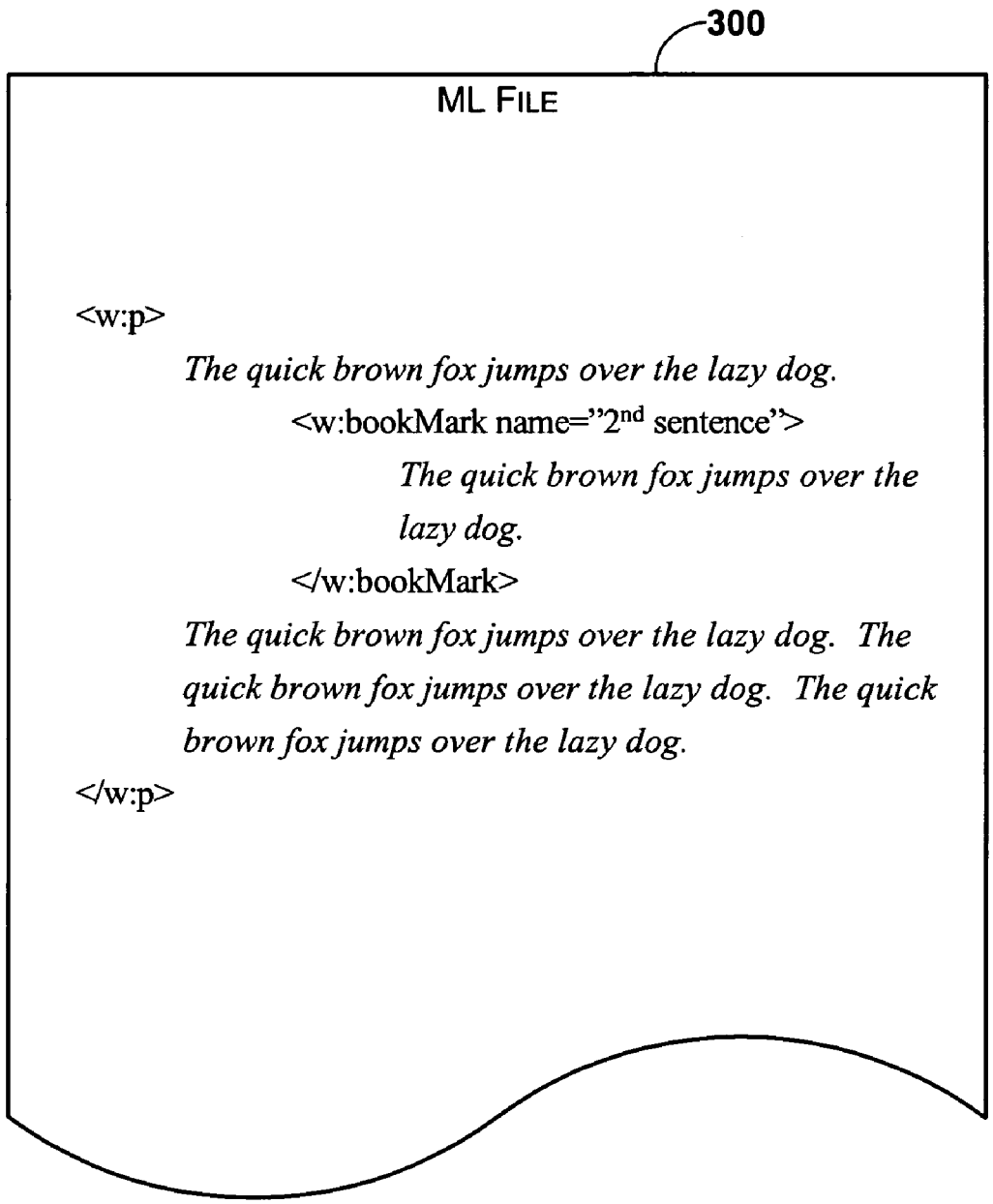
FIG. 3 illustrates an exemplary ML files including some formatted text.

FIG. 3 illustrates an exemplary ML file including some formatted text, in accordance with aspects of the present invention. ML file 300 includes ML elements. An element in a markup language usually includes an opening tag (indicated by a "<" and ">"), some content, and a closing tag (indicated by a "</" and ">").

There are enough ML elements for an application that understands XML to fully recreate the document from a single XML file. Hint tags may also be included that provide information to an application to help understand the content of the file.

There are a number of fundamental rules when using XML. One of these rules is called "well-formed ness." This means that the XML markup must not overlap. Here is an example of XML that is not well formed:

```
<root>
  <title>
  Here is my title
  <subTitle>
    Here is my sub title
  </title>
  </subTitle>
</root>
```

Note how the <subTitle> tag starts inside of the <title> tag, but the <subtitle> ends outside of the <title> tag. In order for this document to be a well formed XML document, it should look like the following:

```
<root>
  <title>
  Here is my title
  <subTitle>
    Here is my sub title
  </subTitle>
  </title>
</root>
```

There are a number of word-processing features that consist of some type of "structure" applied to a range of text. A bookmark for instance can be applied to a selection of text.

For purposes of this disclosure, assume that a word-processing bookmark is identified by the <w:bookMark> tag. An example will be presented to illustrate.

The quick brown fox jumps over the lazy dog. The quick brown fox jumps over the lazy dog. The quick brown fox jumps over the lazy dog. The quick brown fox jumps over the lazy dog. The quick brown fox jumps over the lazy dog.

If one were to apply a bookmark called "$2^{nd}$ sentence" to the $2^{nd}$ sentence of the above paragraph, the XML representation of that might look something like what is illustrated in FIG. 3.

While this style of tags works for representing the paragraph with the <w:p> tag, and the bookmark with the <w:bookMark> tag. This approach does not always work. What if there were two paragraphs with a bookmark spanning the paragraphs.

Figure 4:
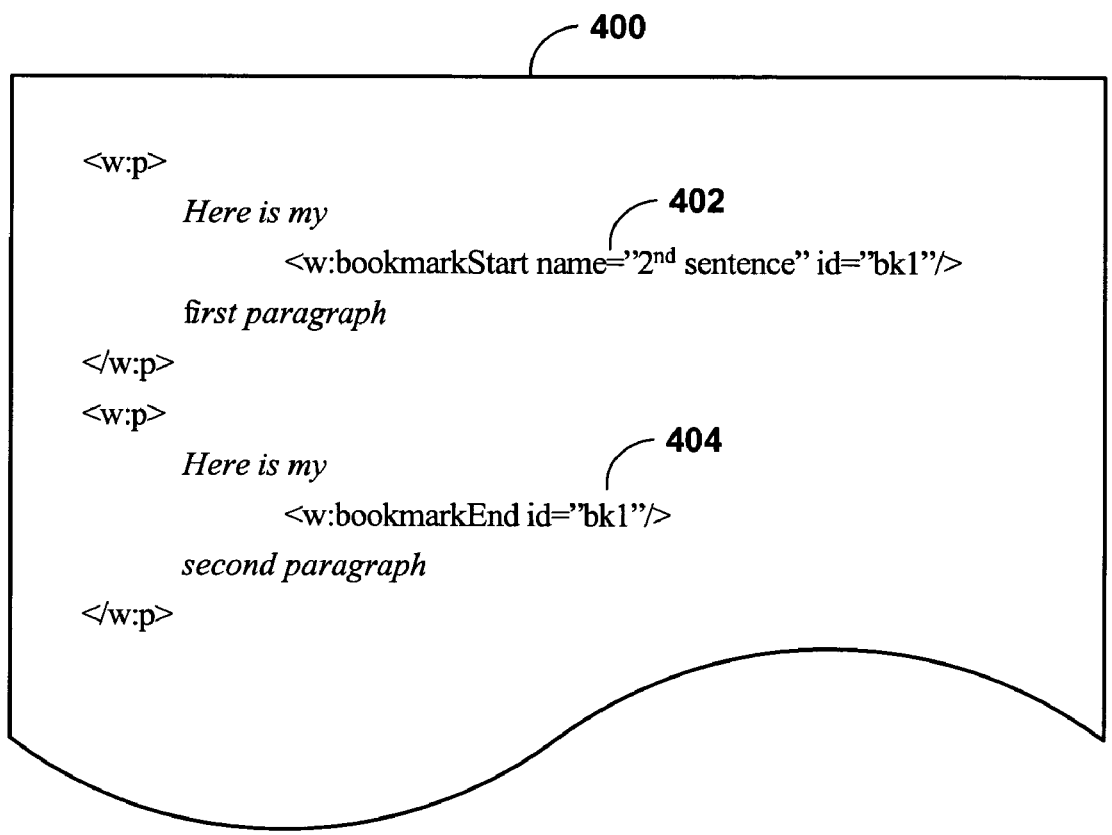
FIG. 4 illustrates an exemplary ML file with a bookmark spanning two paragraphs.

FIG. 4 illustrates an exemplary ML file with a bookmark spanning two paragraphs. The text shown in FIG. 4 is:

Here is my first paragraph
Here is my second paragraph

Using the approach as illustrated in FIG. 4, if you were to apply a bookmark from "first" within the first paragraph to "second" within the second paragraph, the XML would look something like:

<w:p>
Here is my
<w:bookMark name="$2^{nd}$ sentence">
First paragraph
</w:p>
<w:p>
Here is my
</w:bookMark>
second paragraph
</w:p>

The above example is not well formed, as the bookmark tag overlaps the paragraph tags. To create a well formed XML representation, two tags will be used for for objects like bookmarks. According to one embodiment, there will be a <w:bookmarkStart> tag and <w:bookmarkEnd> tag to represent bookmarks. So the above example would be represented as shown in FIG. 4.

Since the <w:bookmarkStart> and <w:bookmarkEnd> tags are both empty tags, they don't have the problem of wrapping the <w:p> tag. Instead, they are two empty tags that are associated with each other by the id attribute contained within both of the tags. With this method, it is possible to show where a bookmark starts and ends, while still maintaining a well formed document.

According to one embodiment, using empty tags is used for a number of different features in the word-processor, including: Range Level permissions; Bookmarks; Comments; Tracked changes; Spelling Errors; and Grammar Errors.

Bookmarks are used in Word processing documents for a variety of reasons. Bookmarks allow a user to call attention to part of a document without actually altering the document. A bookmark allows a user to easily get back to that point in the document.

Bookmarks become even more powerful with XML. Since XML is a text based format that is easily readable and parseable, bookmarks become a great way to getting into a specific portion of a rich document. Bookmarks may also be used within XML documents to index the documents based on their bookmarks. For example, documents stored on a server may be bookmarked and then indexed.

Bookmarks not only identify a key areas in a document, they also allow a user to select a range within a document. In other words, this is analogous to taking a book, and instead of just inserting a bookmark on a single page, a user could highlight a specific section of text within the book.

Since bookmarks can be applied to a range, one could use an XML parser to show the textual values of all bookmarks in a specific document or in a group of documents.

This provides bookmarks something that is not possible using most XML schemas. Just as an example, take the following example schema for a memo. Assume the following elements: "To:", "From:", "Subject:" and "Message:".

These elements would allow a user to create a structured memo that could easily be routed to the proper recipient. An example memo is as follows:

<memo><from>Brian</from>
<to >Scott</to >
<subject>Hello</subject>
<message>Hey there, how's it going. Did you finish the task of mailing the feedback?</message>
</memo>

Now, what if the actual task of "mailing the feedback" were of interest to certain people? It's obvious that tasks aren't always going to be in a memo, so there probably wouldn't be an actual "task" element in the memo schema. Even if there were, there are probably a number of other types of things that can randomly appear in a memo that some people may want to flag, but that wouldn't appear in the memo schema.

With the bookmark feature, it is possible to flag that bit of text within the "message" element, so that XML parsers could easily parse through not just the memo, but parse through relevant bits of data within the actual message. The following is an exemplary way to bookmark the "mailing the feedback" section.

<memo><from>Brian</from>
<to>Scott</to >
<subject>Hello</subject>
<message>Hey there, how's it going. Did you finish the task of
<w:bookmarkStart name="Feedback" id="bk2"/>
mailing the feedback?
<w:bookmarkEnd id ="bk2"/>
</message>
</memo>

Figure 5:
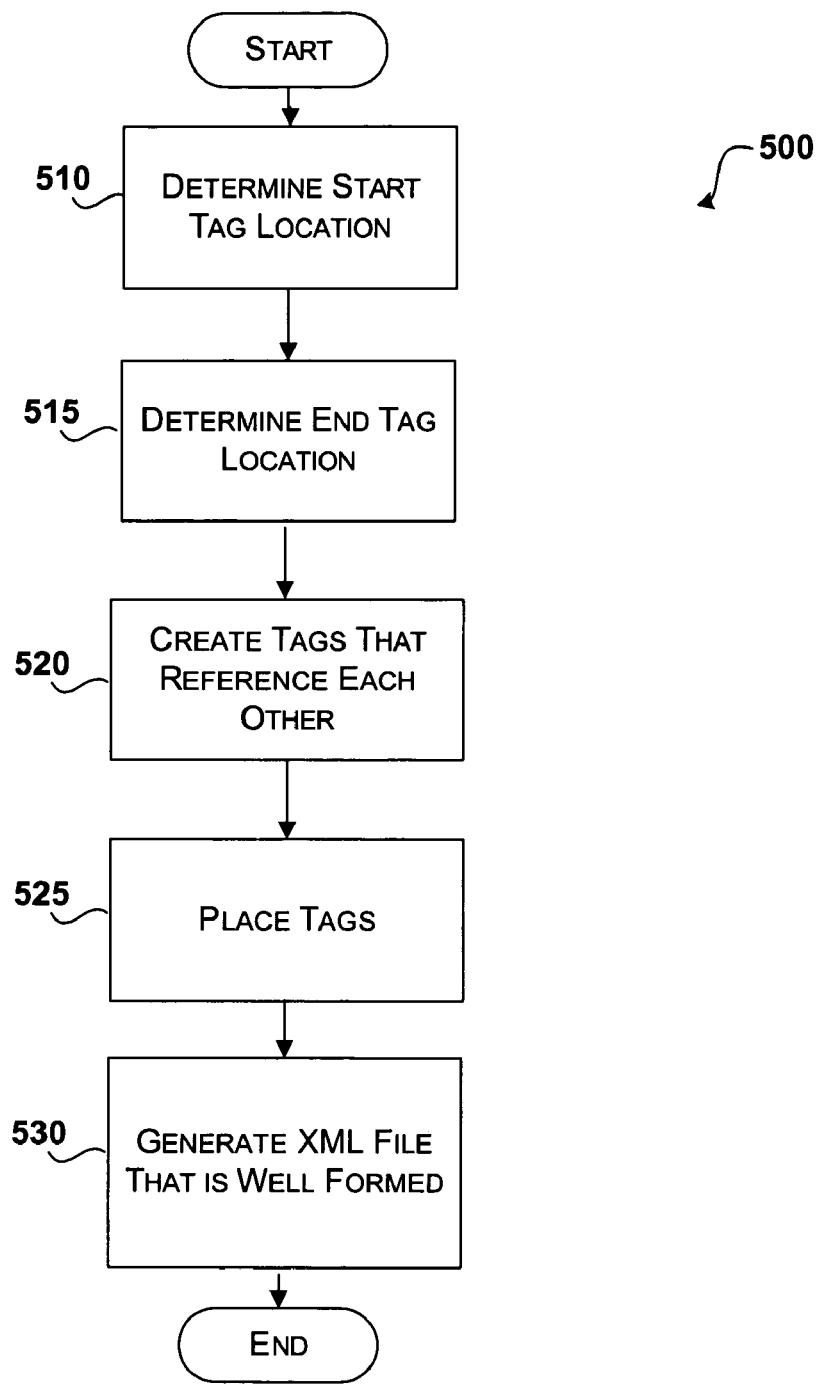
FIG. 5 illustrates a process for representing non-structured features in a well formed document, in accordance with aspects of the invention.

FIG. 5 illustrates a process for representing non-structured features in a well formed document, in accordance with aspects of the invention. After a start block, process 500 flows to block 510 where the start tag is determined. The start tag may be located anywhere within the document. Moving to block 515 the end tag location is determined. As discussed above, the end tag may span other elements while still maintaining a well formed document. Flowing to block 520, the start and end tags are created. According to one embodiment of the invention, the tags reference each other through the use of an "id" that is common to both tags. Moving to block 525, the tags are placed within the document. Flowing to block 530, the XML file that is generated is well formed even though there are non-structured elements contained within the file. The process then moves to an end block and returns to processing other actions.

Here is an exemplary definition of a paragraph, in accordance with aspects of the invention. Some of the elements, include: aml:annotation; proofErr; permStart; permEnd

```
<xsd:complexType name="pElt">
    <xsd:sequence>
        <xsd:element name="pPr" type="pPrElt" minOccurs="0">
            <xsd:annotation>
                <xsd:documentation>Paragraph
properties</xsd:documentation>
            </xsd:annotation>
        </xsd:element>
        <xsd:choice minOccurs="0" maxOccurs="unbounded">
            <xsd:element ref="aml:annotation" minOccurs="0"
maxOccurs="unbounded"></xsd:element>
            <xsd:element name="proofErr" type="proofErrElt">
                <xsd:annotation>
                    <xsd:documentation>Proofing state
(grammar, spelling, etc)</xsd:documentation>
                </xsd:annotation>
            </xsd:element>
            <xsd:element name="permStart" type="permStartElt">
                <xsd:annotation>
                    <xsd:documentation>Range Protection
Permission Start</xsd:documentation>
                </xsd:annotation>
            </xsd:element>
            <xsd:element name="permEnd" type="permElt">
                <xsd:annotation>
                    <xsd:documentation>Range Protection
Permission End</xsd:documentation>
                </xsd:annotation>
            </xsd:element>
            <xsd:element name="r" type="rElt">
                <xsd:annotation>
                    <xsd:documentation>Run element. This is
the leaf container for data in a Word document -- text, pictures,
etc</xsd:documentation>
                </xsd:annotation>
            </xsd:element>
            <xsd:element name="fldSimple" type="simpleFieldType"
minOccurs="1" maxOccurs="unbounded">
                <xsd:annotation>
                    <xsd:documentation>Simple word field
(with plain text instructions). These are run-time calculated entities in
word (eg: page numbers, etc)</xsd:documentation>
                </xsd:annotation>
            </xsd:element>
            <xsd:element name="hlink" type="hLinkType">
                <xsd:annotation>
                    <xsd:documentation>hyperlink element
(analagous to HTML <a href=...> tag)</xsd:documentation>
                </xsd:annotation>
            </xsd:element>
            <xsd:element name="subDoc" type="subDocElt">
                <xsd:annotation>
                    <xsd:documentation>Link to sub
document (i.e. master document / sub documents)</xsd:documentation>
                </xsd:annotation>
            </xsd:element>
            <xsd:element name="ruby" type="rubyElt">
                <xsd:annotation>
                    <xsd:documentation>asian layout:
phonetic guide (ruby text)</xsd:documentation>
                </xsd/annotation>
            </xsd:element>
        </xsd:choice>
    </xsd:sequence>
</xsd:complexType>
```

According to one embodiment, the following is a definition the aml:annotation element:

```
<xsd:element name="annotation" type="aml:AnnType">
    <xsd:unique
        name="uniqueContentAnchorIdsInsideAnnotations">
        <xsd:selector xpath="aml:content"></xsd:selector>
        <xsd:field xpath="@id"></xsd:field>
    </xsd:unique>
    <xsd:unique
        name="uniqueContextAnchorIdsInsideAnnotations">
        <xsd:selector xpath="aml:context"></xsd:selector>
        <xsd:field xpath="@id"></xsd:field>
    </xsd:unique>
</xsd:element>
<xsd:complexType name="AnnType" mixed="false">
    <xsd:sequence>
        <xsd:element ref="aml:arc" minOccurs="0" maxOccurs="1"></xsd:element>
        <xsd:element ref="aml:context" minOccurs="0"
            maxOccurs="unbounded"></xsd:element>
        <xsd:element ref="aml:content" minOccurs="0"
            maxOccurs="unbounded"></xsd:element>
        <xsd:element ref="aml:property" minOccurs="0"
            maxOccurs="unbounded"></xsd:element>
        <xsd:any namespace="##other"
            processContents="lax" minOccurs="0"
            maxOccurs="unbounded"></xsd:any>
    </xsd:sequence>
    <xsd:attribute name="type" type="type"
        fixed="extended"></xsd:attribute>
    <xsd:attribute name="id" type="aml:idType"
        use="required"></xsd:attribute>
    <xsd:attribute name="author" type="aml:authorType"
        use="optional"></xsd:attribute>
    <xsd:attribute name="createdate" type="aml:dateType"
        use="optional"></xsd:attribute>
    <xsd:anyAttribute namespace="##other"
        processContents="lax"></xsd:anyAttribute>
</xsd:complexType>
```

Where the attribute type xsd:anyAttribute, and element type xsd:any are referenced, is where the word processor specific information can go. Those attributes are described in the attribute group "wordAnnotationGroup":

```
<xsd:attributeGroup name="wordAnnotationGroup">
    <xsd:attribute name="type" type="annotationValuesType"
use="required">
        <xsd:annotation>
            <xsd:documentation>The Word element expressed by this
AML Annotation Tag.</xsd:documentation>
        </xsd:annotation>
    </xsd:attribute>
    <xsd:attribute name="name" type="stringType" use="optional">
        <xsd:annotation>
            <xsd:documentation>For bookmarks, specifies the
bookmark name.</xsd:documentation>
        </xsd:annotation>
    </xsd:attribute>
    <xsd:attribute name="initials" type="stringType" use="optional">
        <xsd:annotation>
            <xsd:documentation>For bookmarks denoting the range
of a comment, specifies the initials of the
comment author.</xsd:documentation>
        </xsd:annotation>
    </xsd:attribute>
    <xsd:attribute name="col-first" type="decimalNumberType"
use="optional">
        <xsd:annotation>
            <xsd:documentation>For table bookmarks, specifies the
column this bookmark begins in.</xsd:documentation>
        </xsd:annotation>
    </xsd:attribute>
    <xsd:attribute name="col-last" type="decimalNumberType"
use="optional">
        <xsd:annotation>
            <xsd:documentation>For table bookmarks, specifies the
column this bookmark ends in.</xsd:documentation>
```

-continued

```
        </xsd:annotation>
    </xsd:attribute>
    <xsd:attribute name="original" type="stringType" use="optional">
        <xsd:annotation>
            <xsd:documentation>The original numbering on display
field rev marking.</xsd:documentation>
        </xsd:annotation>
    </xsd:attribute>
    <xsd:attribute name="displacedBySDT" type="displacedBySDTValue"
use="optional">
        <xsd:annotation>
            <xsd:documentation>When bookmarks border SDTs
(Structured Document Tags), use this attribute to help ensure that they are
inserted into the document next to the SDTs. When we displace the SDTs,
we also displace the bookmarks next to them so the intended result is in
the XML file.</xsd:documentation>
        </xsd:annotation>
    </xsd:attribute>
/xsd:attributeGroup>
```

The values used in the "type" attribute are described below:

```
<xsd:simpleType name="annotationValuesType">
    <xsd:restriction base="xsd:string">
        <xsd:enumeration value="Word.Insertion"></xsd:enumeration>
        <xsd:enumeration value="Word.Deletion"></xsd:enumeration>
        <xsd:enumeration value="Word.Formatting"></xsd:enumeration>
        <xsd:enumeration value="Word.Bookmark. Start"></xsd:enumeration>
        <xsd:enumeration value="Word.Bookmark.End"></xsd:enumeration>
        <xsd:enumeration value="Word.Comment.Start"></xsd:enumeration>
        <xsd:enumeration value="Word.Comment.End"></xsd:enumeration>
        <xsd:enumeration value="Word.Insertion.Start"></xsd:enumeration>
        <xsd:enumeration value="Word.Insertion.End"></xsd:enumeration>
        <xsd:enumeration value="Word.Deletion.Start"></xsd:enumeration>
        <xsd:enumeration value="Word.Deletion.End"></xsd:enumeration>
        <xsd:enumeration value="Word.Comment"></xsd:enumeration>
        <xsd:enumeration value="Word.Numbering"></xsd:enumeration>
    </xsd:restriction>
</xsd:simpleType>
```

So, in the case of a Bookmark, the beginning tag would look something like:

```
<aml:annotation aml:id="0"
w:type="Word.Bookmark.Start" w:name="myBookmark"
/>
```

And the end of the bookmark would look something like:

```
<aml:annotation aml:id="0"
w:type="Word.Bookmark.End"/>
```

According to one embodiment, the following is a list of exemplary proofErr types:

```
<xsd:simpleType name="proofErrType">
    <xsd:restriction base="xsd:string">
        <xsd:enumeration value="spellStart"></xsd:enumeration>
        <xsd:enumeration value="spellEnd">
            <xsd:annotation>
                <xsd:documentation>We take the negative value
of ptl and then subtract one to get the end constant.</xsd:documentation>
            </xsd:annotation>
        </xsd:enumeration>
        <xsd:enumeration value="gramStart"></xsd:enumeration>
        <xsd:enumeration value="gramEnd">
            <xsd:annotation>
                <xsd:documentation>We take the negative value
of ptl and then subtract one to get the end constant.</xsd:documentation>
            </xsd:annotation>
        </xsd:enumeration>
    </xsd:restriction>
</xsd:simpleType>
```

According to one embodiment, the following is a definition of the permStart element:

```
<xsd:complexType name="permStartElt">
    <xsd:complexContent>
        <xsd:extension base="permElt">
            <xsd:attribute name="edGrp" type="edGrpType"
use="optional">
                <xsd:annotation>
                    <xsd:documentation>Group with edit
permissions</xsd:documentation>
                </xsd:annotation>
            </xsd:attribute>
            <xsd:attribute name="ed" type="stringType"
use="optional">
                <xsd:annotation>
                    <xsd:documentation>User with edit
permissions</xsd:documentation>
                </xsd:annotation>
            </xsd:attribute>
            <xsd:attribute name="col-first"
type="decimalNumberType" use="optional"></xsd:attribute>
            <xsd:attribute name="col-last"
type="decimalNumberType" use="optional"></xsd:attribute>
        </xsd:extension>
    </xsd:complexContent>
</xsd:complexType>
```

According to one embodiment, the following is a definition for the permEnd element:

```
<xsd:complexType name="permElt">
    <xsd:attribute name="id" type="stringType"
        use="required">
        <xsd:annotation>
            <xsd:documentation>Id for this Permission</xsd:
                documentation>
        </xsd:annotation>
    </xsd:attribute>
    <xsd:attribute name="displacedBySDT"
        type="displacedBySDTValue" use="optional">
        <xsd:annotation>
            <xsd:documentation>When bookmarks border SDTs
                (Structured Document Tags), use this attribute to
                ensure that they are inserted into the document next
                to the SDTs. We use this attribute because SDTs
                appear in our XML, how they logically appear in
                the Word document, but not neccessarily in the
                same location as they are in the document. When
``` we displace the SDTs, we also displace the bookmarks next to them so the intended result is in the XML file.</xsd:documentation>
　　　　</xsd:annotation>
　　　</xsd:attribute>
　　</xsd:complexType>

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for representing non-structured features in a ML document, comprising:
   determining a start feature tag location for a non-structured feature; wherein the non-structured feature spans a range that begins at a location that is after a start tag of an outer element and before an end tag of the outer element;
   determining an end feature tag location for the non-structured feature; wherein the non-structured feature spans the range that ends at a location that is after the end tag of the outer element;
   placing a start feature tag at the start feature tag location; wherein the start feature tag does not include other elements and the start feature tag includes a start identifier attribute; and
   placing an end feature tag at the end feature tag location, wherein the end feature tag does not include other elements and the end feature tag includes an end identifier attribute; and wherein the start feature tag and the end feature tag are separated by the range while maintaining a well formed ML document;
   determining a reference value, the reference value indicating an association between the start feature tag and the end feature tag;
   setting the start identifier attribute to the reference value; and
   setting the end identifier attribute to the reference value.

2. The method of claim 1, wherein the ML document is an XML document.

3. The method of claim 2, wherein the start feature tag and the end feature tag are named differently.

4. The method of claim 3, wherein the start feature tag and the end feature tag represent a bookmark.

5. The method of claim 4, further comprising, using the bookmark in an index of a set of documents.

6. The method of claim 3, wherein the start feature tag and the end feature tag are used for at least one function selected from a set comprising: annotating, proofing, range protection, commenting, and permissions.

7. A computer-readable storage medium including computer executable instructions for representing non-structured features that span other tags in a ML document, comprising:
   determining a start feature tag location for a non-structured feature; wherein the non-structured feature spans a range that begins at a location that is after a start tag of an outer element and before an end tag of the outer element;
   determining an end feature tag location for the non-structured feature; wherein the non-structured feature spans the range that ends at a location that is after the end tag of the outer element;
   placing a start feature tag at the start feature tag location; wherein the start feature tag does not include other elements and the start feature tag includes a start identifier attribute; and
   placing an end feature tag at the end feature tag location, wherein the end feature tag does not include other elements and the end feature tag includes an end identifier attribute; and wherein the start feature tag and the end feature tag are separated by the range while maintaining a well formed ML document;
   determining a reference value, the reference value indicating an association between the start feature tag and the end feature tag;
   setting the start identifier attribute to the reference value; and
   setting the end identifier attribute to the reference value.

8. The computer-readable medium of claim 7, wherein the ML document is an XML document.

9. The computer-readable medium of claim 8, wherein the start feature tag and the end feature tag may be used for at least one function selected from a set comprising: annotating, bookmarking, proofing, range protection, commenting, and permissions.

10. The computer-readable medium of claim 7, wherein the start feature tag and the end feature tag each include an attribute that is set to a same value indicating the association between the start feature tag and the end feature tag.

11. The computer-readable medium of claim 10, wherein the start feature tag and the end feature tag represent a bookmark.

12. The computer-readable medium of claim 10, further comprising, using the bookmark in an index of a set of documents.

13. A system including a computing device for representing non-structured features in a ML document, comprising:
   an application that is configured to:
      parse a word-processor document;
      determine locations for a start feature tag and an end feature tag; wherein a non-structured feature spans a range beginning at a location associated with the start feature tag location and ends at a location associated with the end feature tag location; wherein the range encompasses multiple other tags in the ML document; and
      place a start feature tag and an end feature tag at the determined locations, wherein the location of the start feature tag indicates a starting position for a non-structured feature and the location of the end feature tag represents an ending position for the non-structured feature; and wherein the start feature tag and the end feature tag are not located within the same ML element while adhering to a well formed ML rule; and wherein the non-structured feature spans the other tags within the ML document;
      determine an identifier indicating an association between the start feature tag and the end feature tag;
      place a start attribute within the start feature tag, the start attribute comprising the identifier;
      place an end attribute within the end feature tag, the end attribute comprising the identifier;
      output the ML document that may be interpreted by applications that understand a ML; and
   a validation engine configured to validate the ML document.

14. The system of claim 4, wherein the ML document is an XML document.

15. The system of claim 14, wherein the start feature tag and the end feature tag may be used for at least one function selected from a set comprising: annotating, bookmarking, proofing, range protection, commenting, and permissions.

* * * * *